United States Patent

Kowal

[15] 3,636,252

[45] Jan. 18, 1972

[54] SERVO FOR VIDEO TAPE APPARATUS WITH EDITING CAPABILITIES

[72] Inventor: Leonard Kowal, Arlington Heights, Ill.

[73] Assignee: Ampex Corporation, Redwood City, Calif.

[22] Filed: Feb. 17, 1969

[21] Appl. No.: 799,872

[52] U.S. Cl......................178/6.6 P, 178/6.6 A, 179/100.2 B

[51] Int. Cl................G11b 15/52, G11b 23/42, G11b 27/02

[58] Field of Search........................178/6.6 A, 6.6 P, 6.6 SC; 179/100.2 T, 100.2 B; 318/314, 318, 329, 20.290; 177/100.2 B

[56] References Cited

UNITED STATES PATENTS

| | | | |
|---|---|---|---|
| 2,854,526 | 9/1958 | Morgan | 179/100.2 |
| 3,260,912 | 7/1966 | Gregory | 318/20.290 X |
| 3,345,457 | 10/1967 | MacLeod | 178/6.6 |
| 3,436,629 | 1/1969 | Adler | 318/20.290 X |
| 3,436,635 | 4/1969 | James et al. | 318/20.290 X |
| 3,437,826 | 4/1969 | Kelley | 318/20.290 |
| 3,450,832 | 6/1969 | MacLeod et al. | 178/6.6 |

*Primary Examiner*—Bernard Konick
*Assistant Examiner*—Steven B. Pokotilow
*Attorney*—Fitch, Even, Tabin & Luedeka

[57] ABSTRACT

A system for a video tape recorder produces reliable video tape assemble edits with no significant time base error by employing digital techniques in the phase control of the head drum and capstan servos.

16 Claims, 6 Drawing Figures

FIG. 6

INVENTOR
LEONARD KOWAL

Anderson, Luedeka, Fitch, Even, & Tabin
ATTYS.

INVENTOR
LEONARD KOWAL

Anderson, Luedeka, Fitch, Even & Tabin
ATTYS.

INVENTOR
LEONARD KOWAL

Anderson, Luedeka, Fitch, Even & Tabin
ATTYS.

SERVO FOR VIDEO TAPE APPARATUS WITH EDITING CAPABILITIES

The present invention relates generally to capstan and head drum servosystems for video tape recording and reproducing apparatus, and more particularly to such systems having the capability of permitting assemble edits without any significant time base errors resulting from the transition to, and the recording of, the added material on the tape.

The editing of helically scanned video tape recordings has heretofore been proposed by either mechanical or electronic techniques. The mechanical method of course involves the cutting and splicing together of the tape to provide the edited material, which is generally considered undesirable in view of the physical disadvantages encountered in carrying out such a procedure and because it is virtually impossible to provide entirely smooth tape edges at a splice which thus typically produces some picture disturbance in the reproduced image due to edge irregularity. On the other hand, electronic editing is accomplished in a substantially automatic and rapid manner while the tape is in motion at normal speed. However, although no edge irregularity is produced as with a mechanical splice, significant time base errors may be introduced at the electronic splice, resulting in possible horizontal shifting of the reproduced video or other picture distortion, as well as the possible loss of horizontal sync in the receiver or monitor. During as assemble edit operation, such time base errors may typically be produced by, for example, the loss of phase-lock of the capstan servo when the recorder is switched from the play to assemble modes, and/or by a deviation in phase between the new control track of the assembled material and the control track signal of the material being assembled to.

Accordingly, it is an object of the present invention to provide an improved system for effecting proper phase-lock synchronism between the rotation of the video head drum, the rotation of the video tape drive capstan, and the video tape control track pulses for normal video tape recording and reproduction.

It is another object of the invention to provide such a system which permits the electronic editing of new video material to existing video material on a tape in a controlled manner and without any significant time base error or resulting picture distortion in the region of the splice or thereafter.

It is a further object of the invention to produce reliable video tape assembly edits without significant time base errors by the general use of electronic digital techniques in conjunction with feedback control of a tape drive capstan servosystem.

Additional objects and advantages of the invention will become apparent upon consideration of the following description in conjunction with the accompanying drawings, wherein.

Figures 1, 6:
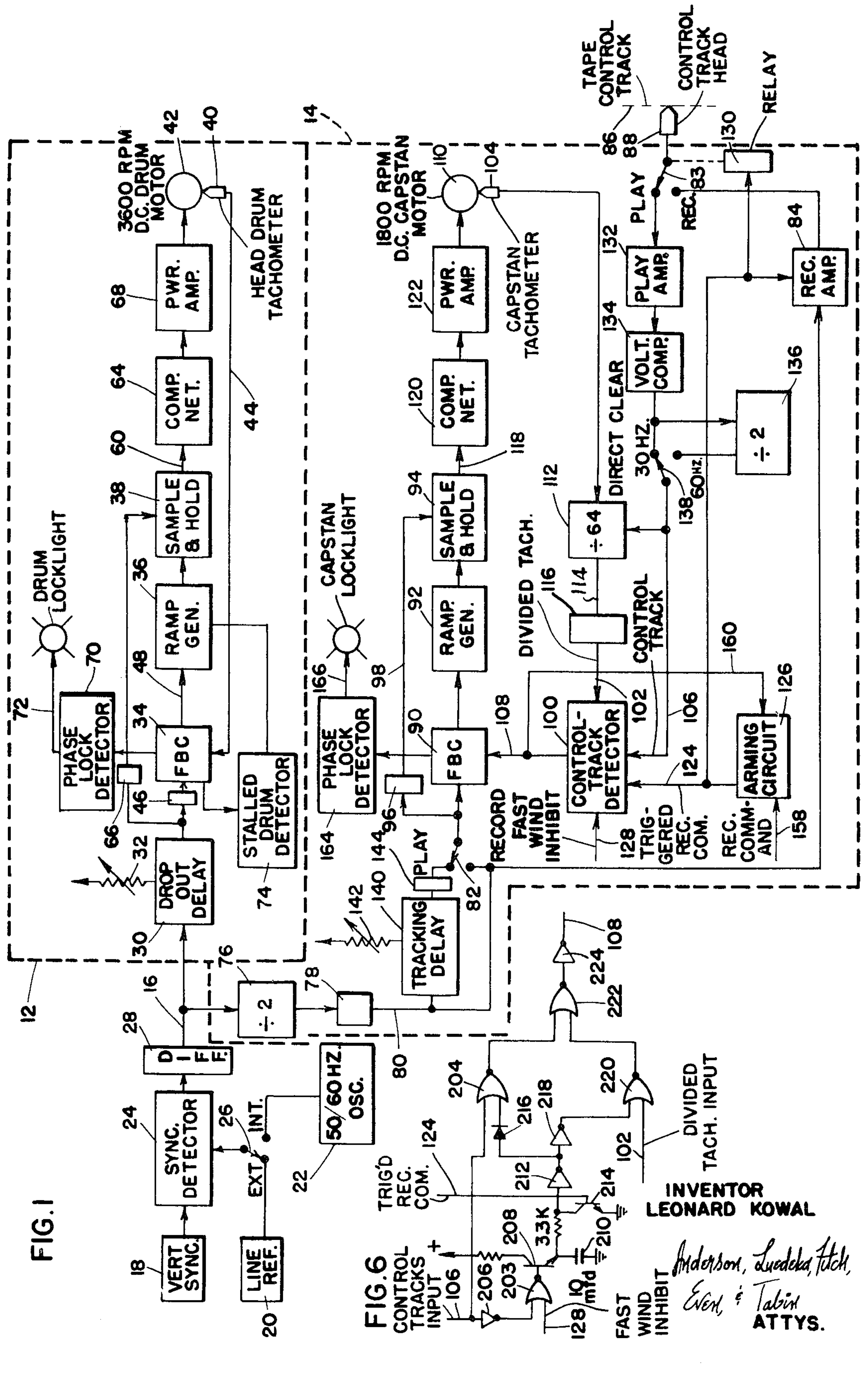
FIG. 1 is a block diagram of a capstan and drum servosystem in accordance with an embodiment of the invention.
FIG. 6 is a schematic diagram of the control track detector circuit of the block diagram illustrated in FIG. 1.

Referring now to FIG. 1, there is generally shown a block diagram of the complete video tape recorder servosystem in accordance with the present embodiment of the invention, which comprises a head drum servo 12 and a tape capstan servo 14, both of which are phase-locked to a reference supplied on input lead 16 by either the vertical synchronizing pulses of a television signal input 18, the power line frequency source 20, or a 50/60 Hz. internal oscillator 22. The vertical sync reference is applied to a synchronizing pulse detector 24 which detects the presence of vertical sync pulses from the television signal input 18, and should vertical synchronizing pulses be absent, the detector 24 automatically provides an output reference of either line frequency or internal oscillator frequency depending on the position of the manual switch 26.

The reference pulse train on lead 16 is utilized as the reference signal for both the drum servo 12 and the capstan servo 14 as well as for generating control track pulses which are recorded on the video tape control track and employed on playback for proper phase control of the capstan motor, as will be described in detail hereinafter. More particularly, the reference pulse train is supplied to the drum servo 12 after being differentiated by differentiating circuit 28 and undergoing a phase shift by means of dropout delay circuit 30 which is adjusted to position the dropout interval as desired when recording on the tape. The dropout delay may be adjustably varied by means of the variable resistor 32, as schematically illustrated, and the dropout interval is typically positioned to occur on the tape just prior to the vertical synchronizing pulse interval. FIG. 2*a* shows the differentiated reference pulse train on lead 16, while FIG. 2*b* shows the delayed output waveform from the dropout delay circuit 30 having a delay D of typically 6 milliseconds for proper dropout positioning in the apparatus of the present embodiment of the invention. The delay circuit 30 may be formed by any suitable monostable multivibrator having an adjustable time constant.

The delayed reference pulses of FIG. 2*b* are fed to signal-comparing means which includes a forward-backward counter 34 of any suitable standard type, a ramp generator 36 and a sample-and-hold circuit 38 and which generates an analogue error voltage indicative of the phase error between the delayed reference pulses and the tachometer pulses from the head drum tachometer 40 located in fixed relation to the head drum 42 and providing the feedback input to the comparing means via lead 44 in a closed loop servo arrangement. In the present embodiment, the tachometer 40 is positioned so that the track pulses on lead 44 precede the vertical sync pulses by 2.2 ms.

The error voltage is utilized to maintain the drum motor 42 in phase-locked synchronism with the reference. More specifically, the leading edge of each delayed reference pulse is differentiated and inverted by the differentiator circuit 46 to produce the negative-going pulses of FIG. 2*c* which are fed to one input of the forward-backward counter 34. The feedback tachometer pulses on lead 44 are supplied to a second input of the forward-backward counter and are correlated with the head drum so that one tachometer pulse is generated for each revolution of the drum. The tachometer pulses on lead 44 are illustrated in FIG. 2*d*.

The output of the forward-backward counter 34 on lead 48 is illustrated in FIG. 2*e* and has a characteristic such that it remains at a relatively low voltage level 50 when the reference pulse rate is less than the tachometer pulse rate, i.e., when two or more reference pulses occur between successive tachometer pulses, and switches to and remains at a relatively high voltage level 52 when the reference pulse rate is greater than the tachometer pulse rate, i.e., when two or more reference pulses occur between successive tachometer pulses. When the reference pulse rate or frequency equals the tachometer pulse rate the counter output is a square wave (i.e., having generally steep leading and trailing edges between relatively constant values, but not necessarily of "squares" dimensions), where the voltage transitions are coincident with the delayed reference pulses and the track pulses, the leading edge of each counter output pulse being coincident with the occurrence of the delayed reference (FIG. 2*c*) and the trailing edge being coincident with the track pulse (FIG. 2*d*). Thus, the pulse width of the square wave counter output signal is directly related to the phase difference between the delayed reference and tachometer pulses and consequently between the reference and the instantaneous drum position as monitored once per revolution.

The ramp generator 36 is responsive to the counter output waveform on lead 48 and functions to time or demodulate this signal for providing an output indicative of the deviation in phase between the delayed reference and head drum position by supplying a ramp voltage to the sample-and-hold circuit 38, each ramp cycle commencing with the occurrence of the trailing edge of the counter output and coincident with the occurrence of each tachometer pulse of FIG. 2*d*.

The delayed reference waveform of FIG. 2*b* has its leading edge differentiated to produce sample trigger pulses illustrated in FIG. 2*f* which are coincident with the inverted counter input pulses of FIG. 2*c*, and the sample trigger pulses are supplied to the sample-and-hold circuit 38 so as to sample each linear ramp voltage, holding the sampled value. Thus, as shown in FIG. 2*g*, each ramp is generated on the occurrence of a tachometer pulse, for example, at the time indicated as 54, and terminated by sampling on the occurrence of a delayed reference pulse and sample trigger pulse, for example, as indicated at time 56. The voltage level of the ramp at the instant of sampling is indicated by the dotted line 58 and this voltage level provides the output signal from the sample-and-hold circuit 38 on lead 60 until a new voltage level is established on the next sampling as indicated by the dotted line 62. Consequently, the sample-and-hold circuit 38 provides an analogue error voltage which is indicative of the phase error of the drum motor as compared to the reference. This signal is then fed through a compensating network 64 and a power amplifier 68 which is employed to drive the drum motor 42 at a speed such that the error tends toward zero.

The compensating network 64 has a time constant dependent on the load inertia, bandwidth and general parameters of the motor and is preferably designed for operating the feedback system in its critically damped mode. The power amplifier may be of any suitable design for driving the DC drum motor at a speed of 3,600 r.p.m. A motor speed of 3,600 r.p.m. results in providing a tachometer pulse output of 60 pulses per second which is the frequency of the vertical sync reference on lead 16 and the standard video field rate. As can thus be seen, the drum servo is a critically damped closed feedback loop servo which maintains the drum in phase-lock synchronism with the vertical sync or internal reference of 60 Hz. frequency. Should the frequency of the track pulses become greater than the reference frequency, the relatively low (or zero) voltage level 50 is applied to the DC drum motor 42 causing its speed to decrease at a relatively rapid rate. Should the frequency of the tachometer pulses become less than the reference frequency, the relatively high (positive) voltage level 52 will be applied to the drum motor 42 to increase its speed at a relatively rapid rate. When the frequency of the tachometer pulses equals the reference frequency the drum motor 42 is rotating at approximately the correct speed but for instantaneous phase deviations which are indicated by the varying width of each of the counter output pulses and which are utilized to effect an error voltage by suitable sampling of each linear ramp or sawtooth voltage waveform so as to be linearly related to the phase error which exists between the tachometer and reference pulses. The sampled voltage is stored, for example, with a capacitor whose charge is increased or decreased with each successive sampling operation. The lead compensation network 64 produces the proper amplitude and phase correction to stabilize the closed-loop servo, and its design depends on the particular parameters involved, being within the skill of the art.

A phase-lock detector circuit 70 is responsive to the output of the forward-backward counter 34 illustrated in FIG. 2*e*, for providing a signal output on lead 72 to the drum-lock light whenever the counter output is a square wave, but provides no output on lead 72 when the counter output waveform is at a constant voltage level, either level 50 or 52. Thus, the drum-lock light provides a confidence indication on the control panel when a phase-lock condition is achieved. A drum-stall detector 74 is also responsive to the forward-backward counter output and detects the absence of a drum phase-lock condition by differentiating the counter output and detecting the absence of the square wave within a fixed predetermined time, typically being approximately 20 seconds. If a successive pulse or spike does not occur within this period, the detector 74 clamps the input to the ramp generator 36 so that no drive voltage is available to the drum motor or, in other words, the relatively low or zero voltage level 50 (FIG. 2*e*) is applied to the head drum motor. Suitable means for resetting this circuit may be provided in any convenient manner such as by turning the recorder power off and then on again. Any suitable differentiating and timing circuit for providing a signal or clamping voltage output may be employed for the phase-lock detector 70 and the stalled drum detector 74, various circuit arrangements of course being apparent to those skilled in the art.

While the drum servo 12 operates generally the same for both the record and play modes, the capstan servo 14 operated in a somewhat different manner in each of these modes and thus each mode will hereinafter be described separately in order to facilitate the understanding of the system operation and construction. The general function of the capstan servo 14 in the record mode is to produce proper longitudinal tape velocity, and this is accomplished by phase-locking the capstan motor to a reference signal which is the same signal that the drum motor 42 locks to, with the exception that it is divided by two so that it has a frequency of 30 Hz. rather than 60 Hz. The use of a 30 Hz. reference enables the system to operate on the basis of control track pulses timed with each video frame as well as those timed with each video field, since there are two fields per frame and the 30 Hz. reference is the common denominator of the two. The 30 Hz. reference is supplied from the output of the two-count scaler 76 and is illustrated by the waveform of FIG. 4*b*. FIG. 4*a* is identical to FIG. 2*a* and shows the differentiated reference pulses on lead 16 serving as the input signal to the two-count scaler 76. The divided reference waveform of FIG. 4*b* is fed to a differentiator 78 which differentiates and inverts the waveform to produce an output pulse train as shown in FIG. 4*c* on lead 80, each pulse being coincident with the leading edge of each scaler output pulse and consequently coincident with every other reference pulse on input lead 16.

With the manual switch 82 in the RECORD position, the differentiated, divided reference is utilized to drive the reference input of the servo-signal-comparing means, and also to supply the signal input of control track record amplifier 84 for recording the control signals onto the control track of the video tape, indicated by the dotted line 86, by means of the control track record and reproduce head 88. The relay 130 is actuated to place the contact 83 in the RECORD position in a manner to be hereinafter described, coupling the amplifier output to the control track head. The output of the control track record amplifier 84 records a 30 Hz. NRZ signal on the tape which erases any previous signal on the track.

More particularly, the signal-comparing means of the capstan servo 14 is similar to that employed in the drum servo 12 and comprises a forward-backward counter 90, a ramp generator 92 responsive to the output of the forward-backward counter and a sample-and-hold circuit 94 which is responsive to the ramp generator output waveform and to the trigger pulses derived from the differentiated 30 Hz. reference on lead 80 after being reinverted by invertor 96 and supplied to the sample-and-hold circuit 94 via lead 98. The sample trigger pulses are illustrated in FIG. 4*g* occurring coincidentally with the reference pulses on lead 80 illustrated in FIG. 4*c*. These latter pulses are applied as one input to the forward-backward counter 90 and the other input to this circuit is derived from control track detector 100, the operation of which will now be described.

The control track detector 100 controls the signal which is to be applied to the capstan forward-backward counter 90, and assures that the capstan servo will always be locked to a signal, i.e., that it will not under any circumstances be free running. The control track detector is positioned within the feedback loop of the capstan servo 14 so as to receive one input on lead 102 which is derived from the capstan tachometer 104 and another input on lead 106 which is derived from the control track of the tape 86 via the control track head 88 when the recorder is in its PLAY mode. Since the present consideration assumes the recorder is in its RECORD mode, no control track pulses will be present on the control track input lead 106 and the control track detector 100 will respond only to the input signal derived from the tachometer 104 to provide the second or feedback input to the forward-backward counter 90 on lead 108. For the present purposes it suffices to say that the control track detector 100 under these record conditions provides a signal on output lead 108 which is the inverted version of the received signal on input lead 102. The control track detector is a digital logic and timing circuit having a general characteristic such that it provides an output to the counter 90 derived from the control track pulses at input 106 regardless of the presence or absence of pulses at input 102 whenever a control track signal is present, but when no control track signal is present (as in the RECORD mode) its output is derived from the pulses at input 102, which in turn are derived from the capstan tachometer 104. The presence or absence of a control track signal is determined by the timing function of the detector circuit 100, so that if no control track pulses occur over a duration of, for example, three or four pulse periods or cycles, the detector switches from input 106 to input 102.

The capstan tachometer 104 is responsive to the rotation of the DC capstan motor 110 to provide a given plurality of pulses during each revolution of the capstan indicative of the speed thereof. In the present embodiment of the invention it has been found desirable, for reasons to be later discussed, to provide 64 tachometer pulses per revolution of the tape capstan. The tachometer pulse train produced by the continuous rotation of the capstan motor at 1,800 r.p.m. is thus shown in FIG. 5*a*. These tachometer pulses are then supplied to a 64-count scaler 112 which provides an output on lead 114 of one pulse for every 64 input tachometer pulses, each output pulse thus occurring at a rate of one pulse per capstan revolution. These divided tachometer pulses on lead 114 are inverted by an inverter 116 and fed to the control track detector 100 via the input lead 102. Consequently, the output of control track detector 100 on lead 108 is in the form of tachometer pulses at a rate of one pulse per capstan revolution, which serves as the feedback signal to the second input of the forward-backward counter 90 for maintaining the capstan motor in phase-lock synchronism with the reference during the RECORD mode. The forward-backward counter 90, the ramp generator 92, and the sample-and-hold circuit 94 function in the same manner as the corresponding components 34, 36 and 38, in the drum servo 12 previously discussed above and likewise produce an analogue error voltage on output lead 118 from the sample-and-hold circuit 94 which is linearly related to the phase error which exists between the divided tachometer pulses on lead 108 and the reference pulses on lead 80. This error voltage is then applied to a lead compensation network 120 which produces the proper amplitude and phase correction to stabilize the closed-loop servo, and after compensation, the signal drives the power amplifier 122 which in turn drives the DC capstan motor at 1,800 r.p.m. which is mechanically coupled to the capstan.

A triggered record command voltage is applied to the control track detector 100 via lead 124 from arming circuit 126 to begin recording. This signal maintains the detector 100 responsive to the divided track input rather than to the control track input in a manner described in detail hereinafter. The fast wind inhibit signal provided at input 128 is a control voltage which maintains the divided track signal at the output of the detector in any fast wind mode of operation irrespective of whether a control signal input is present or whether the servo is in its PLAY or RECORD mode of operation.

The divided tach pulses supplied to the forward-backward counter 90 are compared to the reference, and the error signal on output lead 118 causes the power amplifier 122 to drive the DC capstan motor in phase-lock synchronism with the reference and thus with the DC drum motor 42 which is locked to the same reference. In a particular construction in accordance with the present embodiment of the invention, the capstan motor 110 produces capstan rotation to yield a tape velocity of 9.6 inches per second.

The triggered record command signal from the arming circuit 126, in addition to operating the control track detector as previously described, also provides a slow turn-on signal for the record amplifier 84 so as to prevent fictitious pulses from being transmitted from the amplifier output, and the triggered record command signal is also supplied to the coil of relay 130 which maintains the control track head switched to its RECORD position whereby the 30 Hz. signal derived from the divided reference is applied to the tape control track 86.

The general function of the capstan servo 14 in the PLAY mode is to produce proper tracking by the video head of the video tracks recorded on the tape. Thus, in the PLAY mode, the manual selector switch 82 is set to its PLAY position and the relay 130 switch contact 83 is in its normal PLAY position. The control track signal pulses from the tape control track are amplified by the play or control track amplifier 132 and its output drives a voltage comparator circuit 134 which regenerates the pulses to provide general noise immunity in addition to shaping the pulses so that the rise times are sufficiently fast to drive the digital circuitry of the 64-count scaler 112 and the control track detector 100. The voltage comparator circuit 134 may comprise any suitable type of pulse generator such as a Schmitt trigger having a certain switching threshold for discriminating against the presence of noise, having amplitudes generally below the threshold level.

A two-count scaler 136 and a manual selector switch 138 are provided to enable the system to operate from either a field or frame control track rate. That is, when the tape control track contains control pulses at the 30 Hz. rate, the selector switch 138 is merely switched to that position which provides control track input pulses to the digital circuitry at the 30 Hz. rate directly from the voltage comparator circuit 134. But when the system is utilized in conjunction with video tape having control track pulses at the 60 Hz. rate, the manual switch 138 is placed in its 60 Hz. position which places the two-count scaler 136 in series with the voltage comparator circuit 134 which thus derives an input to the digital circuitry of the system at the 30 Hz. rate or, in other words, provides a control track input signal of pulses which are each coincident with every other actual control pulse from the tape control track.

The control track signals are thus supplied to the control track detector 100 via lead 106 and the detector is effectively precluded from responding to the divided track pulses on its input lead 102 so that the output of the control track detector on lead 108 is the inverted control track pulses which are supplied to the forward-backward counter 90 for comparison to pulses derived from the divided reference pulses on lead 80. The control track pulses being supplied to the control track detector 100 on lead 106 also clear the 64-count scaler 112 with each pulse, and the advantage of this operation will be described hereinafter in connection with the assemble edit capability of the system.

A variable tracking delay circuit 140 is coupled in series with the divided reference pulses on lead 80 and the reference input to the forward-backward counter 90. The tracking delay circuit 140 which may be any suitable type of monostable multivibrator, is adjustably variable, as schematically illustrated by the variable resistor 142, for varying the time constant of the delay circuit. This circuit permits adjustment of the tracking of the video head and the recorded video tracks on the tape by advancing or retarding the tape capstan rotation with respect to the rotation of the head drum.

Figure 2:
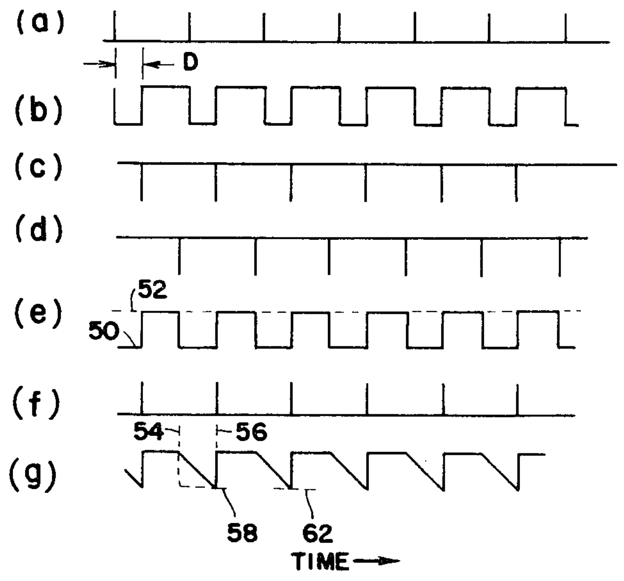
FIG. 2 is a timing diagram illustrating the voltage waveforms at various points in the drum servosystem of FIG. 1, in the record and play modes.
Figure 3:
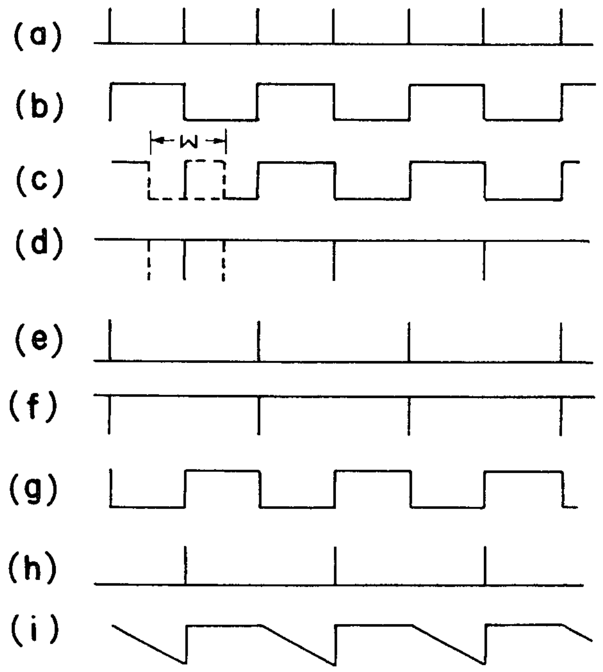
FIG. 3 is a timing diagram illustrating the voltage waveforms at various points in the capstan servosystem of FIG. 1, in the play mode.
Figure 4:
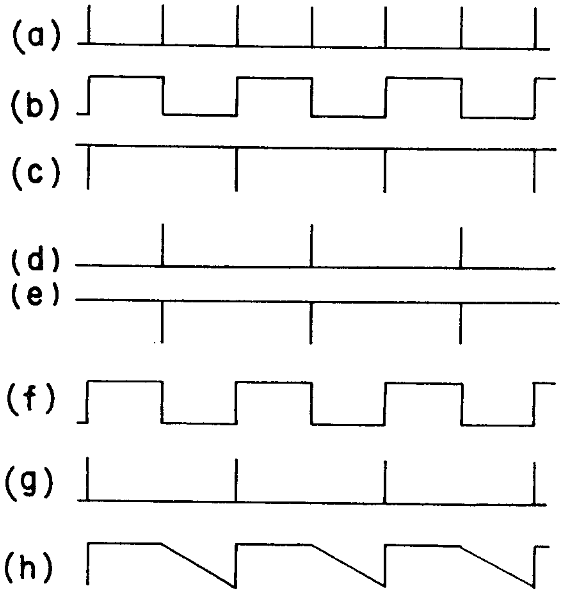
FIG. 4 is a timing diagram illustrating the voltage waveforms at various points in the capstan servosystem of FIG. 1, in the record mode.

Referring now to FIG. 3, various waveforms involved in the PLAY mode of operation of the capstan servo 14 are shown. FIG. 3*a* shows the reference pulses on lead 16 and is the same as illustrated in FIGS. 2 and 4. FIG. 3*b* illustrates the output waveform of the two-count scaler 76 which divides the input reference pulses by a factor of two and is the same waveform which is illustrated in FIG. 4*b* for the record mode. FIG. 3*c* illustrates the output of the tracking delay circuit 140 which provides a delayed pulse waveform based on the divided reference input, and the range of delay which may be provided is indicated as W. The output of the tracking delay circuit 140 is differentiated by differentiator 144 and supplied in this form as the reference input to the forward-backward counter 90. The delayed differentiated reference pulses are illustrated in FIG. 3*e*, and may adjustably be made to occur within the delay range W preceding or succeeding the alternate ones of the reference pulses on lead 16 illustrated in FIG. 3*a*. The delayed reference pulses are also utilized to generate the sample trigger pulses illustrated in FIG. 3*h* after being inverted by the inverter circuit 96.

Since the control track pulses are supplied to the feedback input of the forward-backward counter 90, the capstan servo 14 locks the control track signal to the delayed reference signal in the play mode. Since the head drum is also locked to the same reference, the control track signal is therefore locked to the drum. More particularly, as illustrated in FIG. 3*e*, the control track pulses of are in phase synchronism with the divided reference pulses of FIG. 3*b* and this same pulse train is supplied to the control track input of the forward-backward counter 90 via lead 108, accept for inversion by the control track detector as illustrated in FIG. 3*f*. The operation of the forward-backward counter 90 is as previously described, and provides an output to the ramp generator 92 in the form of a square wave as illustrated in FIG. 3*g* wherein the leading edge of each pulse is coincident with each delayed reference pulse (FIG. 3*d*) and each trailing edge is coincident with each control track pulse (FIG. 3*e*). The width or duration of each counter output pulse is related to the phase difference between the delayed reference and control track pulses, and the occurrence of each trailing edge triggers the ramp generator 92 which times the width of the pulse as marked by the leading edge occurring simultaneously with the sample trigger pulse on lead 98, as illustrated in FIG. 3*i*, and produces an analogue error voltage on output lead 118 which is utilized for controlling the speed of the capstan motor 110 in the manner previously described.

The editing function which may be accomplished particularly advantageously with the servosystem in accordance with the invention is the assemble edit operation. During an assemble edit it is desirable to switch the capstan servo from the phase-lock condition wherein the control track signal is locked to the reference to a phase-lock condition wherein the capstan tachometer signal is locked to the same reference without any loss of phase-lock and with a minimum phase error during the transition from the existing video to the assembled video at the electronic splice. Additionally, it is desirable that the new control track recorded on the tape have a minimum phase error compared to the control track signal which is already on the tape.

In accordance with the principles of the present invention, the capstan is phase-locked to the capstan tachometer and the same reference which is used for the control track phase-lock without any loss of phase-lock during the transition, and no significant phase error is produced. Furthermore, the new control track is recorded with no significant error compared to the control track signal being assembled to. By the term "no significant phase error" it is meant that the error is sufficiently minimal so that the effects of the electronic splice cannot be detected or observed in the practical use of the recording apparatus. For example, there is no noticeable horizontal shift in the reproduced video and substantially no chance of loss of horizontal sync in the video receiver or monitor.

In order to perform this editing function, a predetermined plurality of capstan tach pulses are produced by the capstan tachometer 104 for each revolution of the capstan motor, and the capstan servo is locked to the particular one of the tach pulses which is produced immediately prior to the control track pulse from the tape control track. Then the remaining track pulses occurring during that revolution of the capstan are essentially inhibited. This produces a maximum phase error in radians during the transition to the assembled material of $2\pi$ times the reciprocal of the predetermined plurality of tach pulses per capstan revolution. Hence, the number of tach pulses per revolution is chosen sufficiently great to provide a minimum disturbance to the tape velocity for any particular recorder characteristic.

In the present embodiment of the invention, the number of tach pulses per capstan revolution of the "divisor" is chosen as "64" which is sufficiently high to produce the desired results, as well as being an even binary number that may be handled conveniently by conventional binary digital circuitry. With respect to the principles of the invention, in its broader aspects, however, any number may be used so long as it is sufficiently high to produce the above-described results. In some situations, a divisor of 32 may be utilized as the next lower even binary number to produce satisfactory results. However, if circuitry based on some numbering system other than binary were to be employed, this may affect the numerical value of the divisor chosen. Thus, although the specific numerical value of the divisor may affect the convenience of utilization with any particular electronics, the value need only be of a sufficient plurality so that the permitted deviation of phase between the control track pulses and each tachometer pulse occurring just prior to each control track pulse is sufficiently small to provide no significant phase error and no loss of phase-lock during the transition from the phase-lock condition of the capstan servo during the PLAY mode based on the control track pulses and the ASSEMBLE-RECORD mode based on the tachometer pulses.

In operation, during playback and prior to assemble, the tracking delay control 142 is adjusted for proper tracking of the video signal to which the new material is to be assembled so that the control track pulses are phased such that they occur coincidentally with the vertical sync pulses from the tape and with those from the new material to be added. Since the vertical sync signal is used to generate the new control track signal, the new control track will be recorded in phase with the old control track. This insures that little tape velocity disturbance will occur during playback of the assembly splices.

Figure 5:
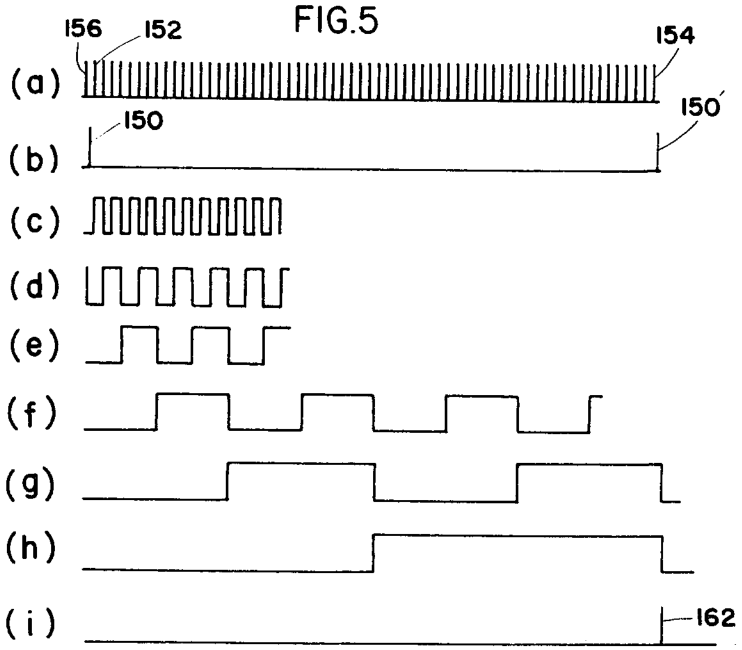
FIG. 5 is a timing diagram illustrating the voltage waveforms involved in the operation of the capstan tachometer of the system of FIG. 1.

With reference to FIG. 5, there is shown in FIG. 5*a* the pulse train produced by the capstan tachometer 104 consisting of 64 pulses per capstan revolution. Simultaneously, since operation is in the PLAY mode, control track pulses are being supplied from the tape control track 86 on lead 106, and these pulses are illustrated in FIG. 5*b* as pulse 150 and 150', being arbitrarily any two successive control track pulses on the video tape. Since each control track pulse clears or resets the 64-count scaler, the first count of the scaler occurs on the first tachometer pulse subsequent to each successive control track pulse. In FIG. 5*a*, then, the first count of the scaler 112 would occur with pulse 152 and the last count, or 64th pulse, of the scaler would occur with pulse 154, for example, slightly ahead of pulse 150' as shown. The signal inputs to the control track detector then include a divided tach pulse 156 on the divided tach input 102 and then, just subsequently, a control track pulse 150 at the control track input lead 106. Since the control track detector circuit has the characteristic that it inhibits or blocks the divided tach input whenever control track signals are present, an inverted control track pulse 150 will appear at the output 108 for normal operation in the play mode.

To begin the assemble operation, the arming circuit 126 is provided with a record command signal at input 158 which enables the arming circuit, but no output signal is generated until a trigger signal is supplied on the trigger input lead 160 by the output of the control track detector 100 on lead 108. Thus, when control track pulse detector 100 on lead 108. Thus, when control track pulse 150 provides a pulse output from the detector 100, this triggers the arming circuit to generate a triggered record command signal on lead 124 which then switches the detector to respond to the divided tach input on lead 102 immediately rather than to any further control track pulses from input 106. Additionally, the triggered record command, which normally inhibits the record amplifier 84, now provides a slow turn-on, as well as an actuating signal which switches the relay 130 to the RECORD position for applying the new control track pulses to the tape control track 86. Meanwhile, the 64-count scaler counts off the capstan tachometer pulses beginning with pulse 152 or the first track pulse occurring after the control track pulse 150 (now assuming this be the last tape control track pulse received.) FIGS. 5c through h illustrate each stage of the binary division, being respectively divided by 2, 4, 8, 16, 32 and finally, by 64, in FIG. 5h. The trailing edge of the divide-by-64 pulse is differentiated and inverted to provide the output pulse 162 as illustrated in FIG. 5i.

From the above, it can be seen that the maximum phase difference between the last control track pulse 150 and the first divided tach pulse 162 is no greater than $2\pi/64$ radians of the capstan wheel, or, as expressed in time, 0.52 millisecond. This value is well within the capability of typical recorders and produces, with complete certainty, no observable distortion during the transition of the splice. During the remainder of the assemble operation, the capstan is phase-locked to the tachometer just as in the regular record mode of operation.

The arming circuit 126, which may be formed by any conventional enabling logic, normally inhibits the detector 100 from switching the capstan servo from control track phase-lock to tach phase-lock after a tach pulse occurs but before the occurrence of a control track pulse, and thus, with the operation of detector 100, prevents the capstan servo from ever falling out of phase-lock.

A phase-lock detector 164, essentially the same as the phase-lock detector 70 in the drum servo 12, is provided with its input coupled to the output of the forward-backward counter 90 and supplies a signal voltage at its output lead 166 to a capstan-lock light whenever it receives the square waveform from the counter 90. Thus, the capstan-lock light provides a confidence indication at the control panel that the capstan is rotating in synchronism with the reference, i.e., at the same frequency, and because of the nature of the servosystem, in phase-lock synchronism therewith.

The functional operation of the control track detector 100 in always maintaining a signal output from either the capstan tachometer or from the control track assures that the capstan servo 14 always operates in a phase-lock condition. Although various digital logic circuits or arrangements may be employed to perform these functions, one desirable circuit arrangement is illustrated in FIG. 6. As there shown, the control track signal on lead 106 is supplied as the first input to NAND-gate 202 after being inverted by inverter 206, and as the first input to NAND-gate 204, the control track signals on lead 106 being in the form of positive-going pulses and designated by the binary "1" state. The fast wind inhibit signal is supplied via lead 128 to the second input of the NAND-gate 202, and is normally in the low-voltage or "0" binary state. Thus, the output of the NAND-gate 202 will reproduce the control track pulses which are applied to the base of an NPN-transistor 208 which is normally nonconductive between control track pulses. But on each inverted control track input pulse to the NAND-gate 202 the output supplies a positive-going pulse which momentarily places the transistor in its conductive state. This results in capacitor 210 charging quickly, which produces a positive DC control voltage at the input of inverter 212.

A discharging transistor 214 is connected in shunt with the input of the inverter 212 and is normally nonconductive in the PLAY mode, but is responsive to the triggered record command signal on lead 124 from the arming circuit 126 for conduction in the RECORD mode. Since the operation is assumed to be in the PLAY mode, the trigger record command signal is at its low-inhibit-voltage or "0" state. The output of the inverter 212 is supplied to the second input of NAND-gate 204 through a diode 216 poled as shown in FIG. 6 and to a further inverter 218. The output of the inverter 212 is in its low-voltage or zero state and thus the NAND-gate 204 will provide at its output an inverted version of the control track input pulses supplied to its first input. The output of the inverter 218 is in its high-voltage or 1 state which is applied to the first input of NAND-gate 220. The divided tachometer input from lead 102 is supplied to the second input of the NAND-gate 220, and is in the form of positive-going pulses. However, since the first input to NAND-gate 220 is in its 1 state, the NAND-gate 220 blocks the divided tach input pulses and provides a zero output to the second input of NAND-gate 222. Since the output of NAND-gate 204 is an inverted version of the control track input pulses and this output is coupled to the first input of NAND-gate 222, the output of the latter NAND gate is a reinverted version of the control track input pulses which are then again inverted by inverter 224 to provide the output on lead 108 which constitutes the feedback input to the forward-backward counter 90, these pulses being illustrated as previously described.

In the record or assemble modes, a high positive or 1 state voltage is supplied by the arming circuit via lead 124 to the base of transistor 214 which places it in its conductive state, rapidly discharging the capacitor 210 and applying a low-voltage of 0 state to the input of inverter 212. This supplies a 1 state to the second input of NAND-gate 204 which blocks the control track input pulses to the first input and maintains the NAND-gate 204 output in its 0 state. At the same time, the output of inverter 218 supplies a 0 state signal to the first input of NAND-gate 220 which then permits the output thereof to provide an inverted version of the divided tach input on lead 102. Thus, the NAND-gate 222 has a 0 state signal at its first input and the inverted tach input pulses at its second input so as to provide a reinverted tach pulse output which is then inverted again by inverter 224 to supply the output on lead 108.

The transistor 208 which has its collector connected to a positive potential through a biasing resistor and its emitter connected to ground through a 10 mf. capacitor, operates in conjunction with a 3.3 K coupling resistor to form a switchable integrator circuit which maintains the control track detector circuit responsive only to the control track input pulses regardless of the presence of divided tach input pulses whenever a control track input signal is present. The presence of the control track input signal is derived by storing successive pulses at the 30 Hz. frequency so that the capacitor continues to provide a positive-voltage or 1 state at the input to inverter 212 even through instantaneously, or between pulses, there is no control track input voltage present. The circuit parameters and time constant may be chosen so that the capacitor 210 discharges sufficiently to provide a low-voltage or 0 state to the inverter 212 in the event there is an absence of three or four control track pulses. A suitable discharging path through the coupling resistor for the capacitor may be provided by the inverter 212 to ground or in any convenient manner. After the absence of three or four control track input pulses, the control track detector circuit 100 then switches to be responsive to the divided tach input on lead 102. Thus, during the normal PLAY mode of operation, the divided tachometer pulse which immediately precedes the control track pulse is blocked by the control track detector which is only responsive to the control track; however, during the transition to the ASSEMBLE or RECORD mode, the control track detector is quickly switched to the divided tach input by the trigger record command to the transistor 214 which immediately disables the integrator circuit. During an assemble, the first control track pulse after the record command supplies the phase-locking pulse to the counter 90, clears the 64-count scaler 112, and triggers arming circuit 126 to provide the triggered record command signal to the detector 100. The next phase-locking pulse supplied to the counter 90 will then be the divided tach from the scaler 112 having a phase deviation from the last control track pulse no greater than $2\pi/64$ radians at 30 Hz. frequency.

Although one embodiment of the invention has been illustrated and described, various modifications and specific circuit implementations will be apparent to those skilled in the art based on the present teachings; and accordingly, the scope of the invention should be defined only by the appended claims and equivalents thereof.

Various features of the invention are recited in the following claims.

What is claimed is:

1. A servosystem for a video tape recorder including a capstan servo comprising a motor coupled to the tape capstan, tachometer means responsive to the rotation of the motor for providing a predetermined plurality of electrical pulses during the period between control track pulses from the video tape, means for providing a reference pulse train having a given pulse rate, means responsive to said predetermined plurality of tachometer pulses and to the control track pulses from the video tape for providing a feedback pulse train derived from the control track pulses for operation in a PLAY mode and from the tachometer pulses for operation in a RECORD mode and including means for deriving, during transition from PLAY to RECORD modes, the feedback pulse train from said predetermined plurality of tachometer pulses having a maximum phase deviation in radians from the phase of the control track pulses no greater than $2\pi$ times the reciprocal value of said predetermined plurality of tachometer pulses, comparing means responsive to said feedback pulse train and to said reference pulse train for providing an error voltage indicative of the phase difference therebetween, and means electrically coupling said error voltage to said capstan motor for providing a motor speed such that said reference and said feedback pulse trains are in continuous phase-locked synchronism.

2. The system of claim 1 further including a closed-loop head drum servo comprising a second motor coupled to the head drum for rotation thereof, tachometer means responsive to the rotation of the motor for providing a feedback pulse output indicative of the speed thereof, second comparing means responsive to the tachometer feedback pulse output and said reference pulse train for providing a second error voltage indicative of the phase difference therebetween, and means electrically coupling said second error voltage to said head drum motor for providing a motor speed such that said reference and said tachometer feedback pulse trains are in continuous phase-locked synchronism, whereby said head drum motor is phase-locked to the record track in said PLAY mode and to the capstan tachometer in the RECORD mode by the common reference.

3. The system of claim 1 wherein said predetermined plurality of tachometer pulses is equal to or greater than 32.

4. The system of claim 1 wherein said comparing means comprises means for providing a first constant level output when the frequency of said feedback pulses is greater than the frequency of said reference pulses and a second constant level output when the frequency of said feedback pulse is less than the frequency of said reference pulses and a square wave output when the frequency of said feedback pulses equals the frequency of said reference pulses with the pulse duration of the output varying according to the phase deviation between the feedback and reference pulses, pulse-generating means for providing a ramp voltage pulse coincident with the generation of the square wave pulse, and sampling means responsive to each ramp voltage pulse and to a trigger signal derived from said square wave to derive said error voltage indicative of the phase difference between said feedback and reference pulses.

5. The system of claim 1 wherein said means for providing a feedback pulse train comprises means responsive to said predetermined plurality of tachometer pulses for supplying a divided output of the same frequency as the control track pulses and having means responsive to each control track pulse for initiating a new count, logic means responsive to the divided output and to the control track pulses for deriving the feedback pulses from the control track pulses regardless of the presence of said divided output, but deriving said feedback pulses from said divided output in the absence of a control track signal, and means responsive to a record command signal for actuating said logic means to derive the feedback pulses from said divided output pulses upon the occurrence of the first control track pulse subsequent to the record command signal.

6. The system of claim 3 wherein said predetermined plurality of tachometer pulses is an even binary number.

7. The system of claim 6 wherein said predetermined plurality of tachometer pulses is 64.

8. The system of claim 1 comprising means for introducing an adjustably variable delay in said reference pulse train for operation in PLAY mode for causing the control track pulses to be coincident with the vertical synchronizing pulses on the video tape and with the synchronizing pulses supplied from material to be assembled, and means for recording the new control track pulses on the video tape for the assembled material, said new control track pulses being derived from said reference pulses.

9. The system of claim 8 wherein said reference pulses have a frequency of 30 Hz.

10. A servosystem for a video tape recorder including a capstan servo comprising a motor coupled to the tape capstan, tachometer means responsive to the rotation of the motor for providing a predetermined plurality of electrical pulses during the period between control track pulses from the video tape, means for providing a reference pulse train derivable from the vertical synchronizing pulses of a television signal or a standard frequency source, circuit means responsive to said predetermined plurality of tachometer pulses having a dividing characteristic equal to said predetermined plurality to provide divided output pulses, and to derive a feedback pulse from the control track pulses whenever such a signal is present, but in its absence, from said divided output signal, comparing means responsive to said feedback pulses and to said reference pulses for providing an error voltage indicative of the phase difference therebetween, means electrically coupling said error voltage to the capstan motor for providing a motor speed such that said reference and said feedback pulses are in continuous phase-locked synchronism, and means for deriving control track signals for operation in a RECORD mode from the reference pulses in coincidence with the vertical synchronizing pulses of the tape and with the vertical synchronizing pulses of the material to be assembled, said system further comprising a head drum servo responsive to said reference pulses and to feedback pulses derived from a drum tachometer, whereby the rotation of the video head drum, the tape capstan and the control track pulses are in phase-locked synchronism with said reference pulses.

11. A servosystem for video tape apparatus comprising a capstan motor for driving the video tape, means responsive to a signal on the tape to provide electrical control pulses therefrom, tachometer means responsive to the rotation of the motor for providing a number of electrical pulses during the period between successive control pulses, means for providing a train of electrical pulses having a reference pulse rate, means responsive to the pulses from said tachometer means and to the control pulses for providing a feedback pulse train derived from the control pulses for operation in a PLAY mode and from the tachometer pulses for operation in a RECORD mode and including means for deriving, during transition from PLAY to RECORD modes, the feedback pulse train from the tachometer pulse occurring immediately prior to a control pulse, comparing means responsive to said feedback pulse train and to the train of reference pulses for providing an error signal indicative of the phase difference therebetween, means electrically coupling said error signal to said capstan motor for varying the speed of said motor in a manner to reduce said phase difference, and means for generating a sufficiently high predetermined number of tachometer pulses during said period between control pulses so that deviation of phase between the control pulses and each tachometer pulse occurring just prior to each respective control pulse during the PLAY mode is sufficiently small to provide no loss of phase-lock in the apparatus during the mode transition.

12. The system of claim 11 further comprising a head drum motor, second tachometer means responsive to the rotation of the head drum motor for providing a feedback pulse output indicative of the speed thereof, second comparing means responsive to the second tachometer feedback pulse output and said reference pulse train for providing a second error signal indicative of the phase difference therebetween, and means electrically coupling said second error signal to said head drum motor for varying the speed of the motor in a manner to reduce the phase difference, whereby said head drum motor is phased-locked to said control signals in the PLAY mode and to the capstan tachometer pulses in the RECORD mode by the common reference pulse train.

13. The system of claim 11 wherein said means for providing a feedback pulse train comprises a divider for producing one output pulse for every said predetermined number of pulses to provide an output pulse rate equal to that of said control pulses, and means for resetting said divider on the occurrence of each of said control pulses.

14. The system of claim 13 wherein said means for providing a feedback pulse train further comprises logic means responsive to said output pulses and to said control pulses for deriving said feedback pulses from the control pulses when said control pulses are present and from said output pulses when said control pulses are absent, and means responsive to a record command signal for actuating said logic means to derive said feedback pulses from said output pulses upon the occurrence of the first control pulse subsequent to the record command signal.

15. A servosystem for video tape apparatus comprising a capstan motor for driving the video tape, means responsive to a signal on the tape to provide electrical control pulses therefrom, tachometer means responsive to the rotation of the motor for providing a predetermined number of electrical pulses during the period between successive control pulses, means responsive to the pulses from said tachometer means and to the control pulses for providing a feedback pulse train derived from the control pulses for providing a feedback pulse train derived from the control pulses for operation in a PLAY mode and from other pulses for operation in a RECORD mode and including a scaler for producing one of said other pulses for every predetermined number of tachometer pulses, an means for resetting said scaler on the occurrence of each of said control pulses, said tachometer means generating a sufficiently high predetermined number of tachometer pulses during said period between control pulses so that deviation of phase between the control pulses and each tachometer pulse occurring just prior to each respective control pulse during the PLAY mode is sufficiently small to provide no loss of phase-lock in the apparatus during transition from the PLAY mode to the RECORD mode.

16. The system of claim 15 wherein said means for providing a feedback pulse train further comprises logic means responsive to said other pulses from the scaler and to said control pulses for deriving said feedback pulses from the control pulses when said control pulses are present and from said other pulses when said control pulses are absent, and means responsive to a given signal for actuating said logic means to derive said feedback pulses from said other pulses upon the occurrence of the first control pulse subsequent to said given signal.

* * * * *